Patented Oct. 9, 1923.

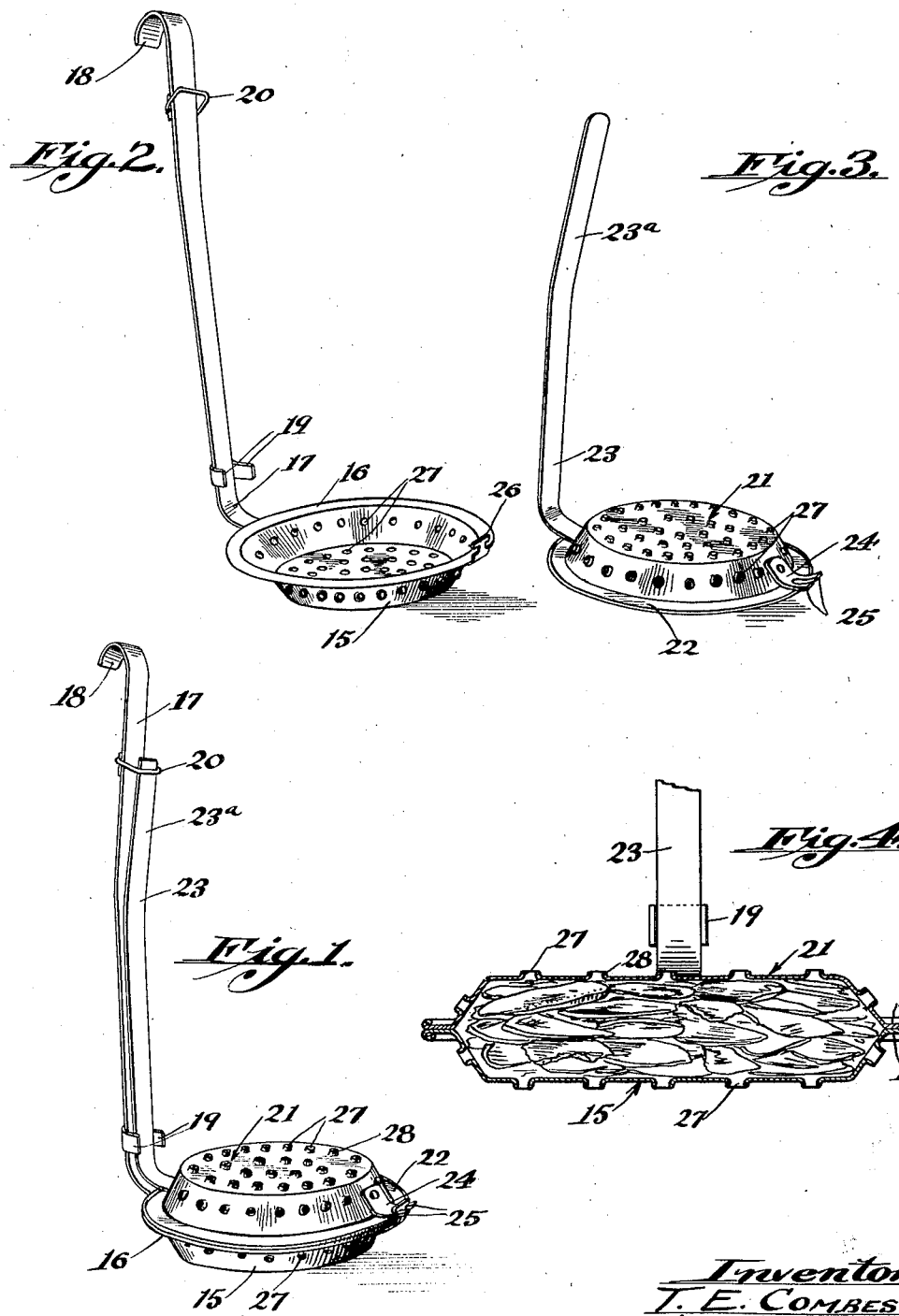

1,470,521

UNITED STATES PATENT OFFICE.

THOMAS E. COMBEST, OF VAN NUYS, CALIFORNIA.

POTATO-FRYING DEVICE.

Application filed August 19, 1922. Serial No. 582,896.

*To all whom it may concern:*

Be it known that I, THOMAS E. COMBEST, a citizen of the United States, residing at Van Nuys, in the county of Los Angeles and State of California, have invented new and useful Improvements in Potato-Frying Devices, of which the following is a specification.

My invention relates to cooking utensils, and more particularly to a device for frying potatoes and the like.

A purpose of my invention is the provision of a potato frying device of extremely simple, inexpensive and durable construction, and which operates to retain a multiplicity of slices or particles of potatoes in intimate relation to each other so that when the device is placed within boiling grease, the potato slices will be confined within a restricted area so that during the frying operation the slices will be fried en masse.

It is also a purpose of my invention to provide a cooking device which is particularly adapted for use in producing the food product embodied in my co-pending application Serial No. 582,985 filed August 19, 1922, and to this end the body sections of the device are provided with perforations formed by punching the sections outwardly so that the flanges of the walls of the perforations are disposed outward to prevent the adhering of the potato particles to the surfaces of the sections, and to thereby permit of the removal of the food product from the device without the possibility of the product being disintegrated.

Although I have herein shown and described only one form of potato frying device embodying my invention, it is to be understood that various changes and modifications may be made herein without departing from the spirit of the invention and the spirit and scope of the appended claims.

In the accompanying drawings,

Figure 1 is a view showing in perspective one form of frying device embodying my invention.

Fig. 2 is a detail perspective view of the main section comprised in the device shown in Fig. 1.

Fig. 3 is a view similar to Fig. 2 showing the other section of the device shown in Fig. 1.

Fig. 4 is a vertical sectional view of the body of the device shown in the preceding views.

Referring specifically to the drawings in which similar reference characters refer to similar parts, my invention, in its present embodiment, comprises a main section including a pan 15 having an annular flange 16 to which is secured or formed integral therewith an elongated extension 17 terminating in a hook 18. The extension is provided adjacent the pan 15 with spaced lugs 19, and adjacent the hook 18, the extension is formed with a keeper 20 pivotally mounted thereon to occupy releasing or locking position.

The other section of the device comprises a cover 21 formed with a peripheral flange 22. Riveted or otherwise secured to the cover 21 is an extension 23 which is adapted to fit between the lugs 19 for properly positioning the cover upon the pan 15. As clearly shown in Fig. 1, the upper end of the extension 23 is adapted to be engaged by the keeper 20 for retaining the extension between the lugs, and as a consequence the cover in proper position upon the pan. As shown, the upper end of the extension 23 is bent outwardly as indicated at 23$^a$ so that such end is normally spaced from the extension 17, and when engaged by the keeper 20 is held under tension.

The pans 15 and 21 can be hingedly associated with each other so as to permit the raising of the cover without the covering becoming actually disconnected from the pan 15. To this end the cover is provided with a curved plate 24 bifurcated at its free end to provide spaced and curved fingers 25. These fingers are adapted to engage beneath the head of a T-shaped projection 26 riveted or otherwise secured to the pan 15. The curvature of the fingers 25 allows of the pivotal movement of the cover upon the pan so that the cover can be elevated to a position in which the removal of the contents of the device can be readily effected. This connection also allows of the ready disconnection of the two sections of the device when filling or when washing the device.

As clearly shown in Fig. 4, the pans 15 and 21 are provided with perforations 27 through which boiling grease is adapted to percolate into intimate contact with the potatoes contained within the device. These perforations are formed by outstriking the metal so as to dispose the flanges indicated at 28 outward with respect to the chamber formed by the pans 15 and 21. It is necessary that these flanges be so arranged to prevent the adhesion of potatoes to the walls of the pans during the frying operation.

In practice, the pan 15 is adapted to be filled with sliced potatoes previously saturated in a seasoning and adhesive solution, such as salt water. The cover pan 21 is now moved to closed position and the extension 23 latched by means of the keeper 20. The device can now be suspended within a pot of boiling grease by means of the hook 18 with the pans 15 and 21 submerged in the grease as will be understood. By virtue of the perforations 27, grease comes into intimate contact with the potatoes thereby frying the same, and when the potatoes have been properly fried, a food product is produced in the form of a cake, the slices of potatoes adhering to each other by virtue of the adhesive solution.

What I claim is:

1. A frying device comprising a bottom pan section, an extension formed on the section, spaced lugs formed on the extension, a hook formed on the free end of the extension, a keeper pivoted on the extension, a cover pan section, both of said pan sections being perforated, a pivotal connection between the pan sections, and an extension formed on the cover pan section and adapted to be interposed between the lugs to be engaged by said keeper for the purpose described.

2. A frying device comprising a bottom pan section, an extension formed on the section, spaced lugs formed on the extension, a hook formed on the free end of the extension, a keeper pivoted on the extension, a cover pan section, both of said pan sections being perforated, a pivotal connection between the pan sections, and an extension formed on the cover pan section and adapted to be interposed between the lugs to be engaged by said keeper, the free end of the second extension being bent at an angle so that when engaged by said keeper the extension will be held under stress.

3. A frying device comprising a bottom pan section and a cover pan section, means on the sections for releasably securing the sections together, an extension on one of the sections, and suspending means on the other section coacting with said extension to urge the pan sections to positions in which said securing means operates to secure the sections together, said suspending means and extension being substantially perpendicular to the principal plane of the sections.

4. A frying device comprising a bottom pan section, an extension formed on the section, spaced lugs formed on the extension, a keeper pivoted on the extension, a cover pan section, a pivotal connection between the pan sections, and an extension formed on the cover pan section and adapted to be interposed between the lugs to be engaged by said keeper, the free end of the second extension being bent so that when engaged by said keeper the extension will be held under stress.

In testimony whereof I have signed my name to this specification.

THOMAS E. COMBEST.